Nov. 16, 1926.
G. SEYMOUR
1,606,962
MACHINERY FOR DECORTICATING THE LEAVES OF FIBROUS PLANTS
Filed June 2, 1926   3 Sheets-Sheet 1
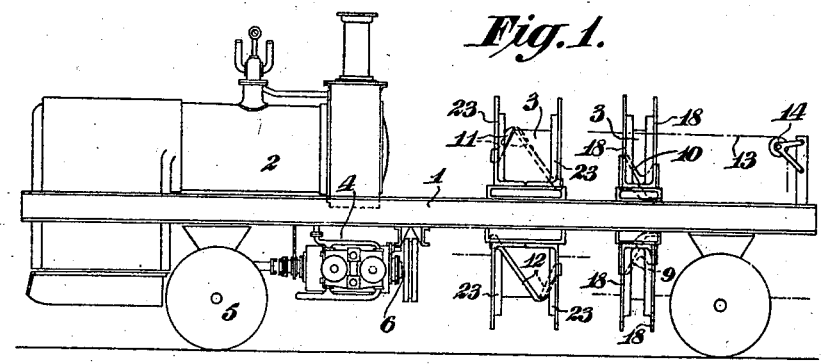
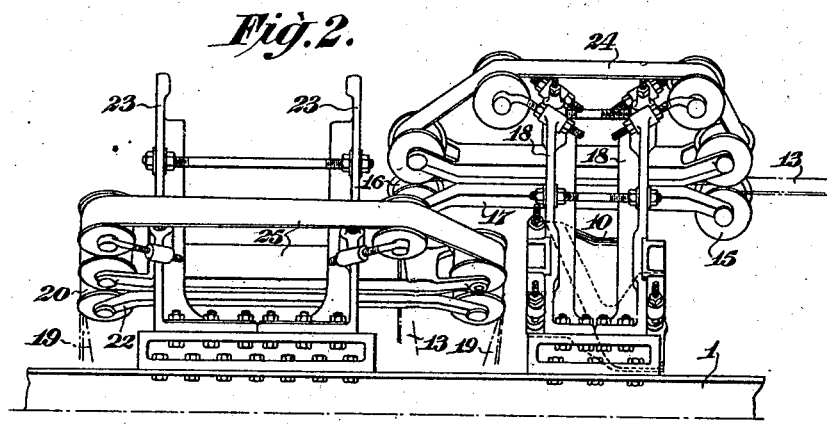
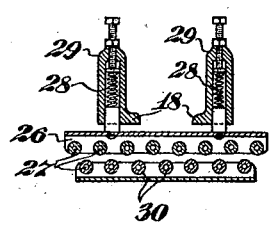
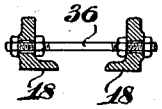
INVENTOR
GEORGE SEYMOUR
By Nov. 16, 1926. 1,606,962
G. SEYMOUR
MACHINERY FOR DECORTICATING THE LEAVES OF FIBROUS PLANTS
Filed June 2, 1926 3 Sheets-Sheet 2
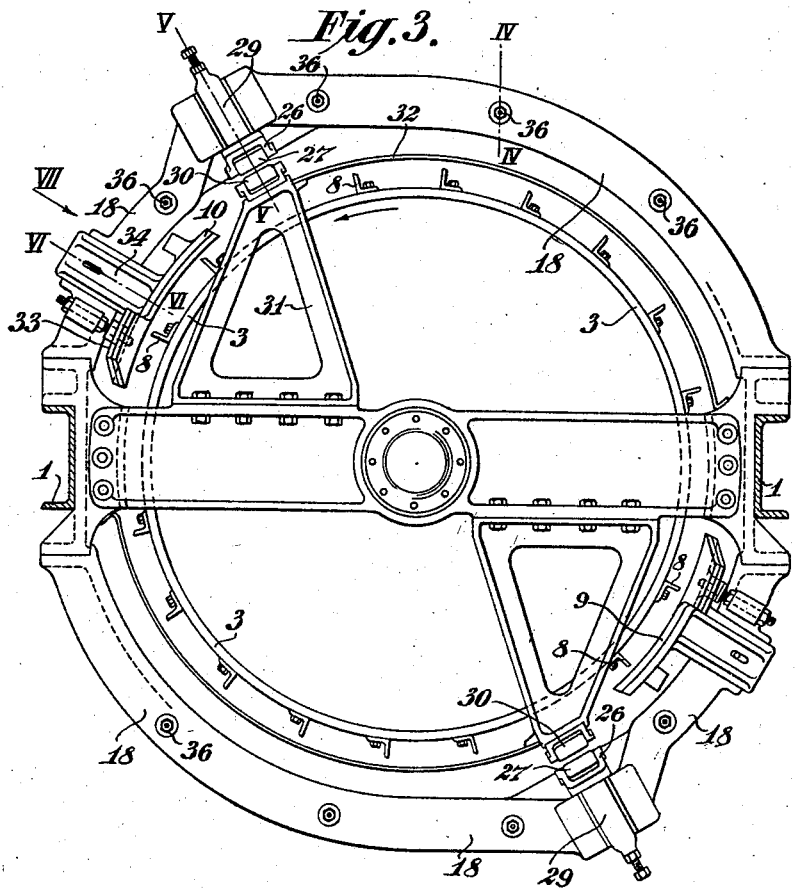
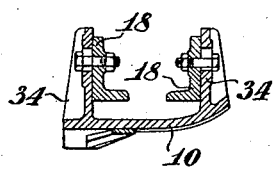
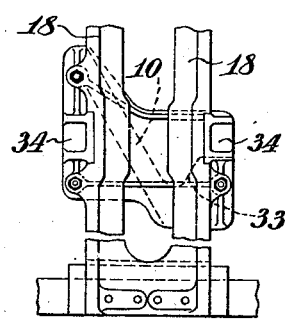
INVENTOR
GEORGE SEYMOUR Nov. 16, 1926. 1,606,962
G. SEYMOUR
MACHINERY FOR DECORTICATING THE LEAVES OF FIBROUS PLANTS
Filed June 2, 1926 3 Sheets-Sheet 3
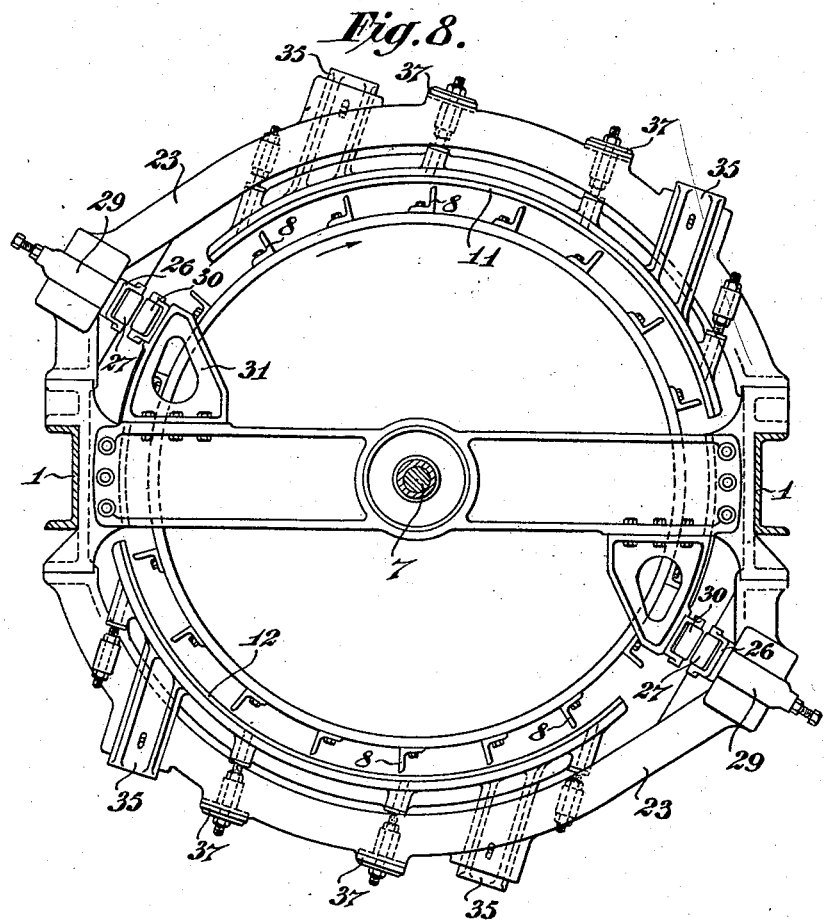
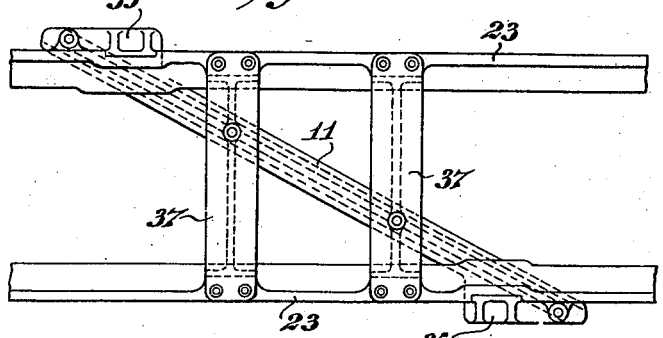
INVENTOR
GEORGE SEYMOUR Patented Nov. 16, 1926.

1,606,962

UNITED STATES PATENT OFFICE.

GEORGE SEYMOUR, OF HARROW, ENGLAND.

MACHINERY FOR DECORTICATING THE LEAVES OF FIBROUS PLANTS.

Application filed June 2, 1926, Serial No. 113,234, and in Great Britain January 19, 1925.

This invention relates to machinery for decorticating or extracting the fibres from the leaves of manila, sisal, coir, Indian hemp, ramie and so forth. The present invention is specially applicable to the elongated spiky sisal leaves (*Agave sisalana*) to remove the meaty or pulpy green bulk and so obtain the small percentage of fibrous material.

Machines of this type usually include a drum or drums of cast iron provided on their peripheries respectively with a plurality of circumferentially spaced decorticator knives of angular section. Said drum rotates over a "concave" or bed of phosphor-bronze, and the leaves are fed between the drum and bed whereby all the extraneous body is stripped from the fibrous skeleton.

The present invention has for its object so to modify and rearrange the parts of the decorticator that the improved machine not only results in increased efficiency, but is applicable for use in a compact and comparatively light manner on a power-driven vehicle. The engine of the latter when stationary drives the decorticator mounted on its chassis.

An easily transportable machine of this nature possesses the main advantage that work can be carried out in the plantations themselves, saving the transport of leaves from various outlying points to a central decorticating station, and the saving of labour is appreciable. Further, the plantations are not so quickly denuded and worked-out, because the discarded green body substance can be returned to the land as a fertilizer. Further, the problem of accumulating heaps of unhealthy rotting vegetation does not arise.

Concerning the increased efficiency, although it is quite old and well-known to employ a pair of side-by-side drums on the same shaft, yet no continuous feed from one drum to the other (as is proposed in connection with this invention) took place, the drums being for all practical purposes two separate decorticators in so far as one half of the leaf was treated on one, then reversed and transferred for finishing to the other. In addition to working continuously, without removal from the conveyor, and completing decortication of the entire leaf, my improvement permits the use of other portions of the drums' peripheries simultaneously. That is to say, whereas with most existing apparatus only about one quadrant of each drum coacts with a bed for useful work; in the present case a pair of diametrically opposite quadrants or circumferential areas are employed, those of one drum being circumferentially offset from those of the other drum as will be more clearly seen later.

Various other detail improvements will be apparent as the following description of an embodiment of the invention develops.

An embodiment of the invention is illustrated by the accompanying sheets of drawings, wherein:—

Figure 1 is a diagrammatic view showing the general disposition of the drums and bed-plates on a vehicle chassis, details being omitted for clearness.

Figure 2 shows, to a larger scale, the top halves of the drums, and leaf-conveying devices.

Figure 3 is an end view of what will be termed No. 1 drum (i. e. the right hand one in Figures 1 and 2) and its associated fittings.

Figure 4 is a section on IV—IV of Figure 3.

Figure 5 is a section on V—V of Figure 3.

Figure 6 is a section on VI—VI of Figure 3.

Figure 7 is a side view of the bed-plate and part of its supporting frames looking from direction of arrow VII of Figure 3.

Figure 8 is an end view of what will be termed No. 2 drum (i. e. the left hand one in Figures 1 and 2) and its associated fittings.

Figure 9 is a development of the bed-plate for No. 2 drum and portions of the frames supporting it.

Referring to the drawings, especially Figure 1, on the chassis 1 of a steam vehicle 2, a pair of drums 3 are rotatably mounted in coaxial relation with their axis disposed longitudinally of the vehicle. These drums 3 are arranged to be rotated by the vehicle's engine 4 which is geared to drive on to the front wheels 5 for transport, or from the shaft 6 on to a shaft (not shown) lying between the chassis frames which can be clutched-in to the drums' shaft 7 (Figure 8) as and when required. Between drum No. 1 and drum No. 2, a reversing gear is interposed so that the drums rotate in opposite directions. The drums carry knives 8 (Figures 3 and 8) extending across their peripheries and suitably spaced apart, and rotate inside suitable bed-plates or "concaves."

These bed-plates may be quadrant-shaped phosphor-bronzes or may be of the improved helical bar type described in my co-pending application No. 113,234. This latter type is described by way of example.

Regarding the drums 3 in side view (one covering the other), the first or front one—from the feeding end—No. 1 (Figures 1 and 3) is provided with two helical beds, one bed 9 at the bottom right quadrant, and one bed 10 at the top left, whilst the back drum No. 2, (Figures 1 and 8) has two, one bed 11 at top right, and one bed 12 at bottom left. The bed-plates of one drum are consequently circumferentially offset in relation to those of the other drum. If all the beds 9—10 and 11—12 were of equal length, the arrangement and disposition would appear identical from both sides, but in the form illustrated, the beds 9—10 of No. 1 drum are much shorter than the beds 11—12. I prefer to work from the rear of the vehicle (thus regarding this as the front of the decorticator) and to treat the leaves in unequal sections, as is explained later.

A conveyor of any suitable description (chain, ropes or the like) extends from drum to drum parallel to their axes. This might be any height depending on the disposition of the beds. I prefer to construct the conveyor two-part, as clearly shown by Figures 2. By this arrangement, the portion of leaf gripped whilst passing across drum No. 1 is released for treatment whilst crossing drum No. 2. To explain fully the conveyor arrangement illustrated:—An endless conveyor belt 13 passes over a pulley 14 mounted on the rear of the chassis and then around any suitable arrangement of guide pulleys mounted conveniently on the chassis and over the pulleys 15 and 16, one each side of drum No. 1. The latter pulleys are mounted on a bracket 17 carried between a pair of substantially semi-circular frames 18—18. These frames 18—18 are duplicated around the bottom of the drums and are mounted on the chassis girders 1, and also constitute the framework for supporting the bed-plates.

The conveyor 13 is disposed across the top of the bed-plate 10 of drum No. 1. Another endless band 19 is furnished for drum No. 2, and is slightly lower running across the pulleys 20 and 21 mounted on a bracket 22 carried by the frames 23—23. As with drum No. 1, the frames 23—23 are duplicated across the bottom of drum No. 2.

For gripping the leaves in the conveyors, there is employed a resiliently pressed endless band 24 for drum No. 1 and 25 for drum No. 2. Referring to Figures 3 and 5, it will be seen that a presser frame 26 with a plurality of rollers 27 is pressed on to belt 24 by the springs 28 housed in the cylindrical housings 29 formed with the frames 18. The belt 13 runs over a second set of rollers 30 mounted at the top of the frame 31. A similar arrangement (to which corresponding reference numerals have been applied) is provided for drum No. 2—see Figure 8.

If the leaves are gripped transversely, after having been fed on to the band 13 between the pulley 14 and drum No. 1, the depending portion e. g. the thick meaty stub at the base, will be treated by the front drum as it passes across the decorticating periphery between drum 3 and bed-plate 10, and the upstanding portion will wrap itself under the frame on the guard plate 32. The bed-plate 10 is formed with an outwardly splayed spade end 33 to facilitate a preliminary crushing at this thick part. After treatment by drum No. 1, the leaf passes on to conveyor 19, being gripped at a part lower down, already decorticated, and the upstanding top portion will then be treated by the bed-plate 12 of drum No. 2. To attain this end, a reversing gear is interposed between the drums so that they are oppositely rotating. The whole arrangement is duplicated underneath the drums so that another leaf can be fed to bed-plate 9 and thence to bed-plate 12 simultaneously with the work over the top bed-plates.

It will be seen from Figures 6, 7 and 9 that the bed-plates 10 and 11 are arranged helically across the drum peripheries, being supported on side wings 34, 34 and 35, 35 respectively, which are capable of slidable adjustment in their respective framework members 18, 18 and 23, 23.

The pairs of frames 18, 18 and 23, 23 are joined together by suitable ties, studs 36 being employed for the No. 1 drum frames (Figures 3 and 4) and tie-plates 37 for the No. 2 drum frames (Figures 8 and 9.)

I claim:—

1. A machine for decorticating the leaves of fibrous plants comprising a portable wheeled chassis, a source of power thereon, a pair of co-axial reversely rotatable drums mounted on said chassis, a plurality of knives on said drums, fixed bed-plates positioned partially around said drums arranged so that the bed-plates for one drum are circumferentially offset to those for the other drum, and a conveyor for feeding leaves from one drum to the other.

2. A machine for decorticating the leaves of fibrous plants comprising a portable wheeled chassis, a source of power thereon, a pair of co-axially arranged reversely rotatable knife carrying drums mounted on said chassis and operable by said source of power, cooperating bed-plates positioned partly around said drums, and the bed-plates of one drum being circumferentially offset from those of the other drum, and a conveyor extending substantially parallel to the axis of said drums and at the sides thereof, said conveyor being adapted to grip the leaves intermediate their length and to pass the adjacent ends of the leaves between one drum and its bed-plates, and finally to pass the opposite ends of the leaves between the second drum and its bed-plates.

3. A machine for decorticating the leaves of fibrous plants comprising a portable wheeled chassis, a source of power thereon, a pair of co-axially arranged reversely rotatable knife carrying drums mounted on said chassis and operable by said source of power, cooperating adjustable oppositely disposed bed-plates for each of said drums, the bed-plates of one drum being circumferentially offset from those of the other drum, and a conveyor for passing the adjacent ends of the leaves between one drum and its bed-plates, and finally passing the opposite ends of the leaves between the second drum and its bed-plates.

In testimony whereof I have affixed my signature hereto this 19th day of April, 1926.

GEORGE SEYMOUR.